United States Patent
Keb et al.

(10) Patent No.: US 10,821,639 B2
(45) Date of Patent: Nov. 3, 2020

(54) MULTI-MATERIAL CONVEYOR COMPONENT

(71) Applicant: Laitram, L.L.C., Harahan, LA (US)

(72) Inventors: Richard A. Keb, Slidell, LA (US);
Ruizhe Ma, Grand Rapids, MI (US);
Michael Hendrik DeGroot, Rockford, MI (US)

(73) Assignee: Laitram, L.L.C., Harahan, LA (US)

( * ) Notice: Subject to any disclaimer, the term of this patent is extended or adjusted under 35 U.S.C. 154(b) by 296 days.

(21) Appl. No.: 16/008,445

(22) Filed: Jun. 14, 2018

(65) Prior Publication Data

US 2018/0290355 A1 Oct. 11, 2018

Related U.S. Application Data

(62) Division of application No. 15/075,490, filed on Mar. 21, 2016, now Pat. No. 10,016,920.
(Continued)

(51) Int. Cl.
| | |
|---|---|
| *B29C 45/14* | (2006.01) |
| *B65G 17/40* | (2006.01) |
| *B65G 17/46* | (2006.01) |
| *B29C 51/26* | (2006.01) |
| *B29K 23/00* | (2006.01) |

(Continued)

(52) U.S. Cl.
CPC .. *B29C 45/14549* (2013.01); *B29C 45/14311* (2013.01); *B65G 17/40* (2013.01); *B65G 17/46* (2013.01); *B29C 51/082* (2013.01); *B29C 51/266* (2013.01); *B29C 2045/14319* (2013.01); *B29C 2791/001* (2013.01); *B29K 2023/065* (2013.01); *B29L 2031/7092* (2013.01)

(58) Field of Classification Search
CPC ........ B65G 17/46; B65G 17/40; B65G 15/62; B65G 17/06; B65G 15/30; B65G 17/30; B29C 51/00; B29C 45/14549; B29C 45/16; B29C 45/14; B29C 45/78; B29C 45/14311; B29K 2023/065
USPC ................................ 198/837, 841, 850–853
See application file for complete search history.

(56) References Cited

U.S. PATENT DOCUMENTS

| | | | | |
|---|---|---|---|---|
| 5,074,144 | A | * 12/1991 | Krofchalk | ............. G07C 5/085 340/439 |
| 5,361,893 | A | 11/1994 | Lapeyre et al. | |

(Continued)

FOREIGN PATENT DOCUMENTS

| | | |
|---|---|---|
| JP | 58151215 A | 9/1983 |
| JP | 63262322 A | 10/1988 |

(Continued)

OTHER PUBLICATIONS

Extended European Search Report, European Application No. 16773742, dated Aug. 29, 2018, European Patent Office, Munich Germany.
(Continued)

*Primary Examiner* — James R Bidwell
(74) *Attorney, Agent, or Firm* — Catherine M. Bishop

(57) ABSTRACT

A conveyor component comprises a thermoformable portion chemically bonded to an injection molded base portion. A surface of the thermoformable portion is prepared for bonding. Then an injection moldable material is injected onto the prepared surface to form the injection molded base portion.

10 Claims, 5 Drawing Sheets

Related U.S. Application Data

(60) Provisional application No. 62/140,013, filed on Mar. 30, 2015.

(51) Int. Cl.
  *B29L 31/00* (2006.01)
  *B29C 51/08* (2006.01)

(56) References Cited

U.S. PATENT DOCUMENTS

| | | | |
|---|---|---|---|
| 5,507,383 A | 4/1996 | Lapeyre et al. | |
| 5,820,813 A | 10/1998 | Hara et al. | |
| 6,695,135 B1 | 2/2004 | Lapeyre | |
| 6,880,696 B2 | 4/2005 | Cediel et al. | |
| 7,222,730 B2 | 5/2007 | Garbagnati et al. | |
| 7,241,354 B2 | 7/2007 | Fatato et al. | |
| 7,527,144 B2 * | 5/2009 | Ostman | B65G 15/62 |
| | | | 198/823 |
| 7,887,741 B2 | 2/2011 | Kato et al. | |
| 8,522,961 B2 | 9/2013 | Marshall et al. | |
| 9,296,565 B2 * | 3/2016 | Batchelder | B65G 15/62 |
| 10,016,920 B2 * | 7/2018 | Keb | B65G 17/40 |

| | | |
|---|---|---|
| 2007/0284225 A1 | 12/2007 | Volpi |
| 2008/0038569 A1 | 2/2008 | Evans et al. |
| 2009/0104441 A1 | 4/2009 | Sawada et al. |
| 2017/0080637 A1 | 3/2017 | Padhye et al. |

FOREIGN PATENT DOCUMENTS

| | | |
|---|---|---|
| JP | 2003127170 A | 5/2003 |
| JP | 2006321119 A | 11/2006 |
| WO | 2012162233 A2 | 11/2012 |

OTHER PUBLICATIONS

First Office Action and Search Report, Chinese Patent Application No. 201680018128.8, dated Apr. 25, 2019, State Intellectual Property Office of the People's Republic of China.

International Search Report and Written Opinion of the International Searching Authority, PCT/US2016/023390, dated May 30, 2016, Korean Intellectual Property Office, Daejeon, Republic of Korea.

Notice of Rejection, Japanese Patent Application No. 2017-549632, dated Jan. 28, 2020, Japan Patent Office.

\* cited by examiner

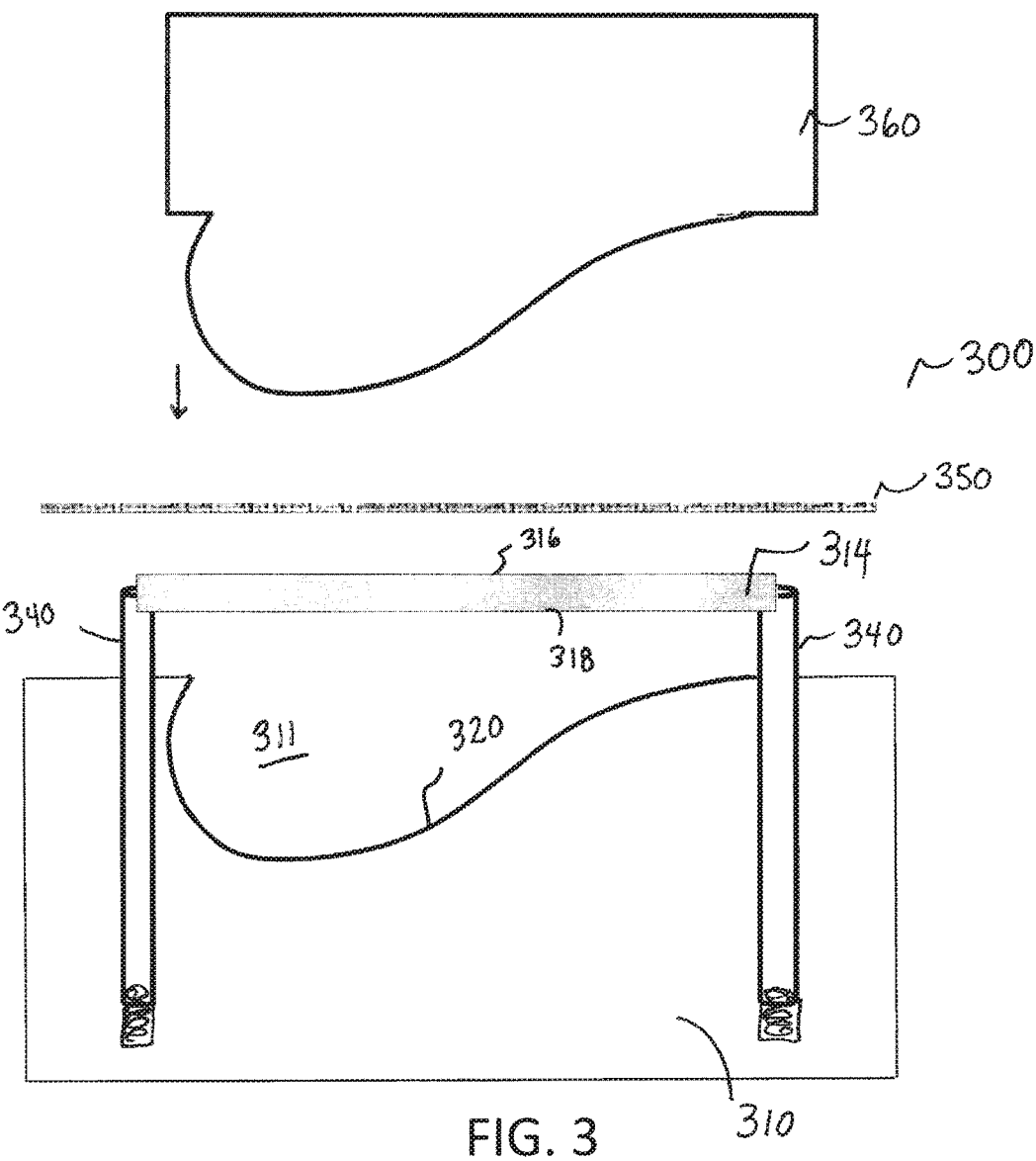
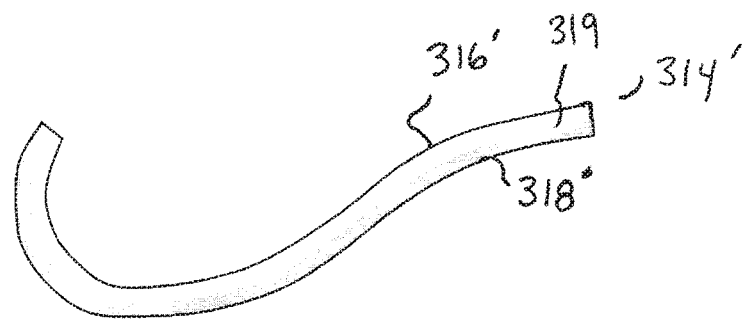
FIG. 3
FIG. 4

MULTI-MATERIAL CONVEYOR COMPONENT

RELATED APPLICATIONS

This application is a divisional of U.S. patent application Ser. No. 15/075,490 filed Mar. 21, 2016 and entitled "Method of Manufacturing a Multi-Material Conveyor Component", which in turn claims priority to U.S. Provisional Patent Application No. 62/140,013, filed Mar. 30, 2015 and also entitled "Method of Manufacturing a Multi-Material Conveyor Component." The contents of both applications are incorporated herein by reference.

BACKGROUND

The invention relates generally to power-driven conveyors and, more particularly, to components in a conveyor system formed by two or more materials bonded together.

Many conveyor components, such as belt modules that link together to form a conveyor belt, position limiters, wear strips and sprockets are injection molded out of a thermoplastic polymer material to form a rigid body.

Problems abound when attempting to form a conveyor component from multiple materials having different characteristics. It may be difficult to have different materials bond together to form a cohesive, unitary component.

SUMMARY OF THE INVENTION

A method of manufacturing a conveyor component involves bonding a thermoformable material to an injection molded material to create a composite component. The resulting conveyor component has portions formed of different materials, optimized for performing different functions.

According to one aspect, a conveyor component comprises a base portion formed of an injection moldable material and an upper layer comprising a thermoformable material chemically bonded to the injection moldable material.

According to another aspect, a conveyor component comprises a thermoformed first layer and an injection molded base portion chemically bonded to the thermoformed first layer.

BRIEF DESCRIPTION OF THE DRAWINGS

The disclosed systems and methods can be understood with reference to the following drawings. The components in the drawings are not necessarily to scale.

FIG. 3 is a schematic diagram of a portion of a molding machine used in the process of FIG. 2

FIG. 4 shows a substrate of a thermoformable material in an intermediate state during the manufacturing process of FIG. 2;

DETAILED DESCRIPTION

A method of joining a thermoformable material to an injection moldable material to form a conveyor component is provided. The invention will be described below relative to certain illustrative embodiments, though the invention is not limited to the illustrative embodiments.

Figure 1:
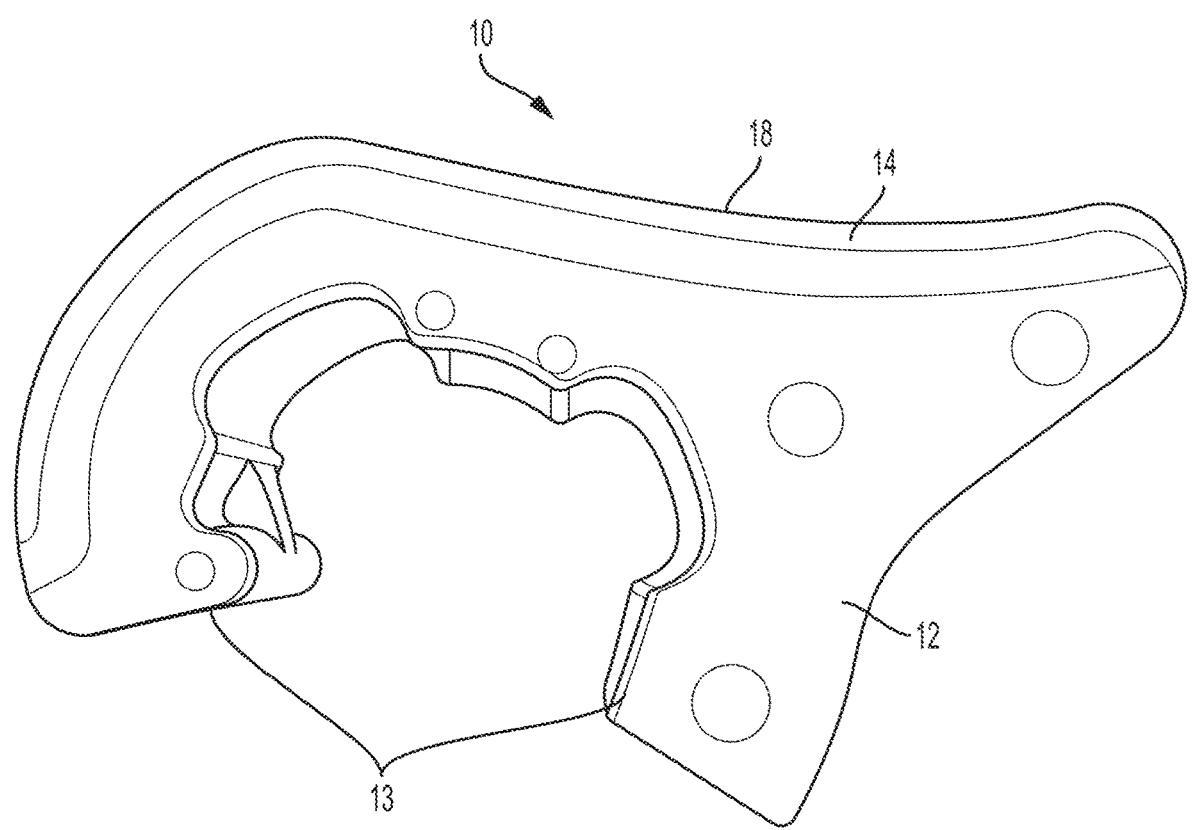
FIG. 1 shows a conveyor component formed by bonding a thermoformable material to an injection molded material.

FIG. 1 shows an embodiment of a conveyor component 10 comprising multiple materials chemically bonded to each other. The illustrative conveyor component 10 is a position limiter including a base portion 12 formed of a first material and an upper layer 14 formed of a second material bonded to the first material. The illustrative upper layer forms a limiting surface for contacting a conveyor belt to ensure proper engagement between a tooth on the conveyor belt and a sprocket driving the conveyor belt. The illustrative base portion 12 is formed of an injection molded material. The upper layer 14 comprises a thermoformable material bonded to the injection molded material during a manufacturing process.

The first material comprises an injection moldable material. As used herein, "injection moldable material" refers to any suitable material or combination of materials that may be injection molded to form a selected shape. Injection moldable materials are able to transition to molten form when heated. Examples include, but are not limited to thermoplastic polymer materials, such as polypropylene, polyethylene, acetal, or composite polymers.

The base portion 12 includes a snap clamp 13 for mounting the conveyor component to a shaft of a conveyor frame, as described in U.S. patent application Ser. No. 14/602,455, field Jan. 22, 2015 and entitled "Snap-On Position Limiter for a Conveyor Belt", the contents of which are herein incorporated by reference.

The second material comprises a themoformable material. As used herein, "thermoformable material" refers to any suitable material or combination of materials that is thermoformable, i.e., able to be formed by heat and-or compression. A thermoformable material does not transition to molten form when heated and retains a solid, though malleable form. Examples include, but are not limited to ultrahigh-molecular-weight polyethylene (UHMW), ceramic-impregnated plastic, and others known in the art. An example of a ceramic-impregnated thermoformable material is Ceram P® available from Quadrant EPP AG Corporation of Lenzburg, Switzerland.

The upper layer 14 forms a limiting surface 18 for guiding a conveyor belt relative to a sprocket. In one embodiment, the limiting surface 18 of the upper layer has a low coefficient of friction to facilitate its limiting function.

The ability to use two separate materials with different properties enables different parts of the conveyor component to have optimal properties for that parts' particular function. For example, the base portion 12 is formed of a stronger material to withstand certain forces and the limiting surface 18 is formed of material with a low coefficient of friction to facilitate the limiting function.

Figure 2:
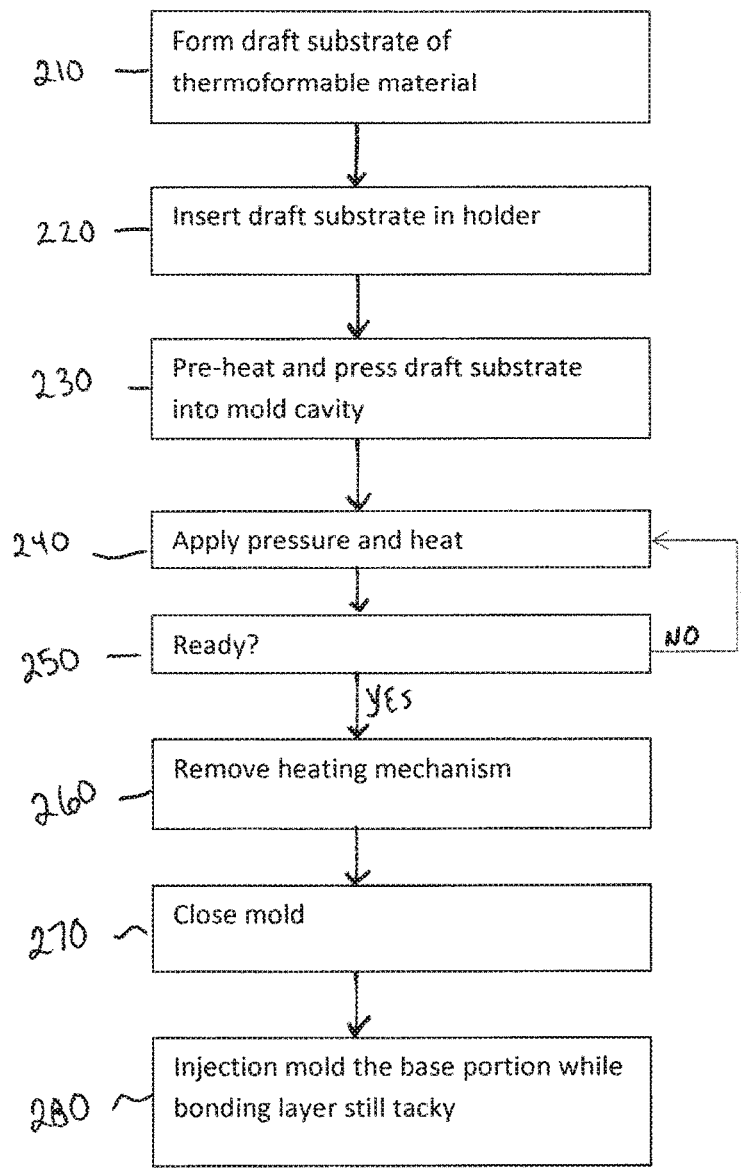
FIG. 2 shows the manufacturing steps involved in forming a multi-material conveyor component according to an embodiment of the invention.

FIG. 2 illustrates the steps involved in manufacturing a conveyor component, such as the conveyor component 10 of FIG. 1, having a base portion 12 formed of an injection moldable material and an upper layer 14 comprising a thermoformable material bonded to the injection molded material.

FIG. 3 is a diagram of a portion of a molding machine used in the process of FIG. 2. The molding machine 300 uses an injection mold including a first mold half, shown as a bottom mold 310. The bottom mold 310 includes a mold cavity 311 forming a mold surface 320 that defines the upper surface 18 of the final conveyor component 10. The machine 300 includes holders for holding a substrate 314 of a thermoformable material. The holders 340 comprise spring-loaded pins forming an initial seat for the substrate 314 and extending through the bottom mold. The pins 340 initially hold the substrate above the mold cavity 311. The machine also includes a heating mechanism 360 for heating the thermoformable substrate.

In a first step 210, a "draft" (first version or prototype) insert and-or substrate 314 of a thermoformable material is formed. The draft substrate may be stamped, cut or otherwise formed into a basic outline shape through any suitable means known in the art. The draft insert/substrate could be a simple flat piece sized to a desired size, or could be a more complicated substrate of any size or shape. In the illustrative embodiment, the draft substrate 314 is cut to about the size of the mold surface 320 in the mold cavity 311. Preferably, the draft substrate has a −0 to +15% tolerance to allow slight expansion to cover the mold surface 320. If necessary, heat may be applied to form the draft substrate 314. The draft substrate 314 has a first surface 318 that forms the limiting surface 18 of the finalized position limiter and an opposite second surface 316 that forms a bonding surface that bonds the upper layer 14 to the base portion 12. The draft substrate 314 may have any suitable thickness.

In step 220, the draft substrate is inserted in a holder 340. The illustrative holder comprises spring-loaded pins inserted in the bottom mold 310 and extending from the top surface thereof. The pins form a seat for holding the draft substrate 314 above the mold cavity 311.

In step 230, a heating mechanism 360 pushes down on the draft substrate 314 to pre-heat and shape the substrate 314. The illustrative heat and pressure mechanism 360 comprises a piece of hardened steel shaped to the final form of the layer 14. The heating mechanism presses the draft substrate 314 into the mold cavity 311 while applying heat to the thermoformable material. The illustrative heating mechanism 360 provides about 2000 watts of heat energy, though the invention is not so limited. The heat and pressure makes the substrate sufficiently malleable to conform to the shape of the mold surface 320, resulting in a shaped substrate 314', shown in FIG. 4, having the shape of the final upper layer of the conveyor component 10. If the draft substrate 314 is already in a desired form, little pressure is applied so that the shape does not substantially change. In another embodiment, infrared energy can be used to heat the draft substrate. Other suitable means for preparing the draft substrate for adhesion can be used.

In step 340, the heating mechanism 360 continues to apply heat and pressure to the shaped substrate 314' until the shaped substrate 314' is ready for bonding with an injection molded portion in step 350. Preferably, the heat and pressure are uniformly applied to the bonding surface 316 of the substrate. In one embodiment, the shaped substrate 314' is in a bondable state when the bonding surface 316' is tacky or adhesive while the opposite surface 318 remains smooth and undeformed, or as close to the original surface finish as possible. In the bondable state, the molecules on the bonding surface 316' are open and ready to chemically bond with another material.

For example, for a UHMW material, the heating mechanism is applied until the shaped bonding surface 316' reaches a temperature of between about 392° F. and about 400° F. The heating mechanism is removed before the opposite surface 318 reaches about 392° F. A "ready" bonding surface for UHMW will become clear, indicative of a bondable state, while the opposite side remains opaque, as shown in FIG. 4. The substrate 314' is ready for bonding when the transition 319 between the bondable material 316' and the smooth material 318' is in the middle of the substrate 314', as shown in FIG. 4.

In an illustrative embodiment, the temperature of the heating mechanism 360 is set to 500° F. to provide a heating mechanism surface temperature of between about 392° F. and about 400° F. While the illustrative heating mechanism 360 is a direct contact metal material form with heater cartridges installed thereon, the invention is not so limited. The heating mechanism 360 may alternatively heat the thermoformable material through an indirect stream of hot air directed at the thermoformable material or through other means known in the art.

The actual temperature, pressure and time involved in getting the thermoformable material into a bondable state vary depending on the thermoformable material.

During application of heat and pressure, the draft substrate 314 may expand in one or more directions, trapping itself within the mold cavity 311.

In one embodiment, the manufacturing process employs a heat transmitting layer 350 between the substrate 314 and the heating mechanism 360. The heat transmitting layer 350 transfers heat from the heating mechanism but prevents the eventually tacky material in the substrate 314 from sticking to the heating mechanism 360. Any suitable material may be used to form the heat transmitting layer. Preferably, the heat transmitting layer comprises a non-stick surface coating, such as polytetrafluoroethylene and others known in the art.

After the substrate 314' is ready for bonding, the heating mechanism 360 is retracted from the ready substrate 314' in step 260. If a heat transmitting layer 350 is used, it is also removed.

An upper mold half (not shown) immediately mates with the bottom mold 310 to close the mold in step 270.

Then, in step 280, injection molding of the base portion 12 commences. Preferably, the mold is preferably closed and injection molding to commences while the substrate 314' is still in the bondable state. Step 280 involves injecting molten injection moldable material into the closed mold in which the ready substrate 314' is contained. Preferably, the gates on the mold for the molten material are located to push the substrate 314' against the surface 320. Thus, the injection pressure is directed towards the adhesive surface 316' and holds the substrate in place within the mold.

The molten injection moldable material contacts the bondable layer 316' of the substrate and the two materials bond and lock onto each other.

The thermoformed substrate 314' is preferably kept to a high enough temperature to continue the bonding process during the cooling of the injection molded portion 12 of the conveyor component. This is done with a variance of tools (for the injection molded portion 12) and/or warming channels in the tool (to keep the non-injection molded substrate 314' to a bondable temperature).

In one embodiment sonic waves may be transmitted into the mold to enhance the bonding between the substrate 314' and the injection molded material. The sonic waves excited the modules to promote bonding. Electronic beams and-or radiation may also be used.

The above-described manufacturing technique may be used for any type of conveyor component that is traditionally injection-molded. Examples include, but are not limited to, sprockets, wear strips, conveyor belt modules, position limiters and other components known in the art.

Figure 5A:
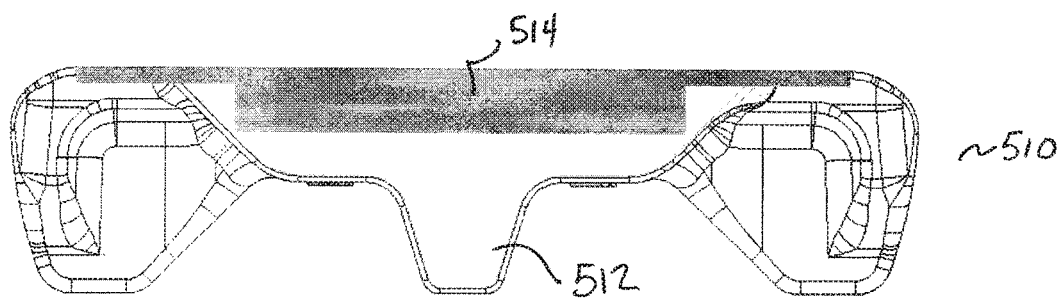
FIGS. 5A and 5B illustrate another embodiment of a conveyor component manufactured by bonding a thermoformable material in a bondable state to an injection molded material during injection molding.
Figure 5B:
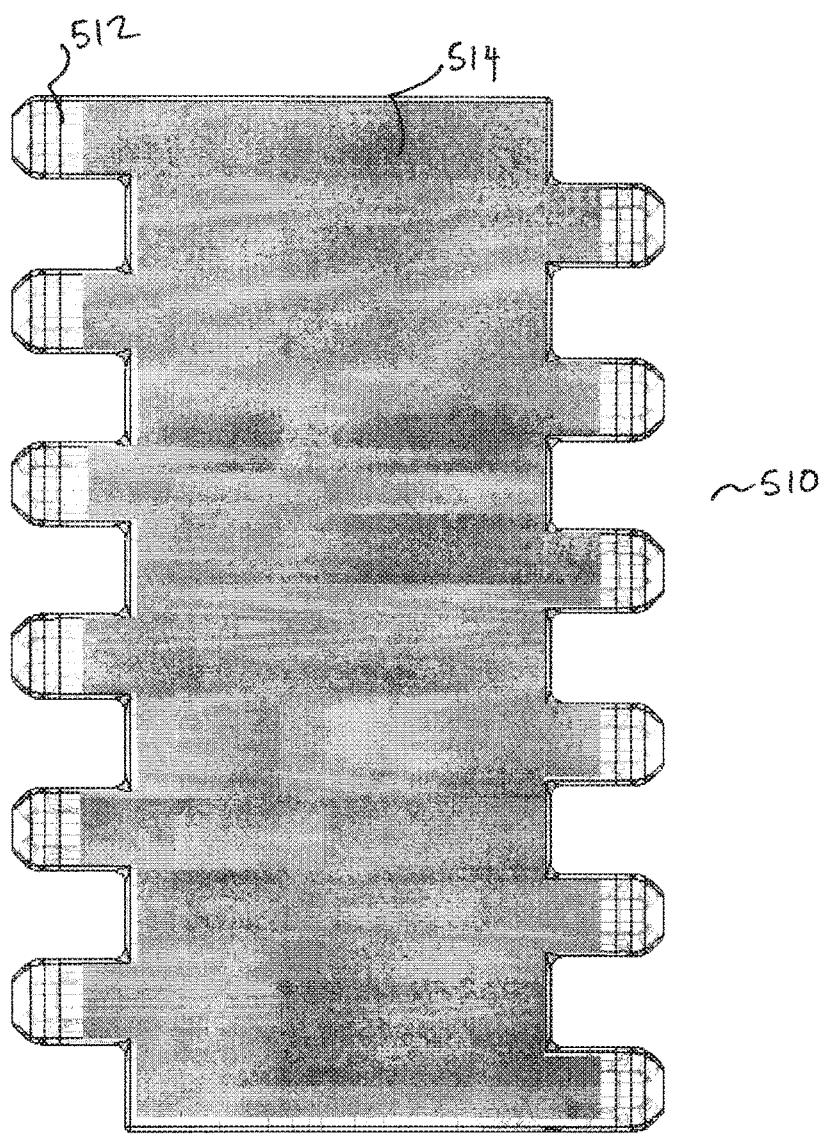

FIGS. 5A and 5B show another embodiment of a conveyor component 510 comprising a thermoformable material bonded to an injection moldable material. The conveyor component 510 is a conveyor belt module including an injection molded base 512 and a thermoformed upper layer 514. The thermoformed upper layer 514 is heated and shaped until a bonding surface of the upper layer is in a ready, bonding state in a mold. Then, the material for the base 512 is injected into the mold while the bonding surface is still in the ready, bonding state to form the base portion 512, such that the base portion 512 is bonded to the upper layer 514.

Figure 6:
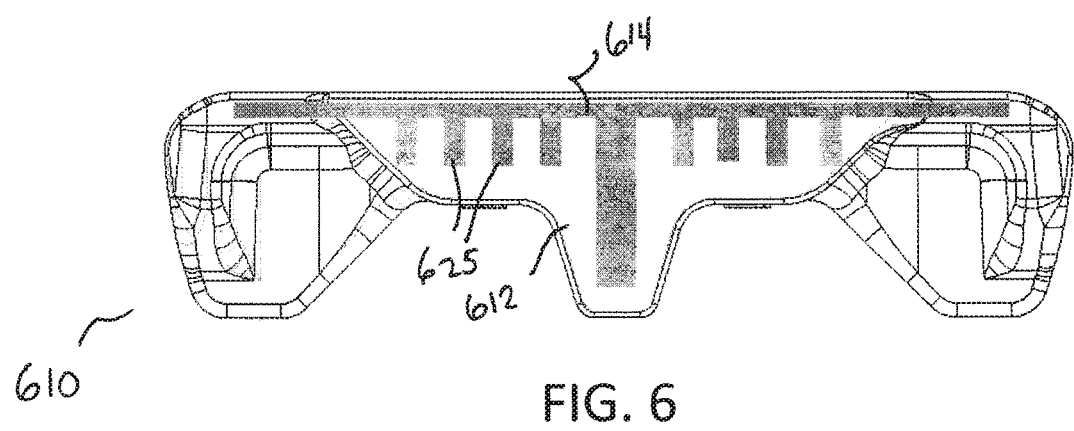
FIG. 6 illustrates another embodiment of a conveyor component manufactured by bonding a thermoformable material in a bondable state to an injection molded material during injection molding.

FIG. 6 shows a conveyor component 610 comprising an injection molded base 612 and a thermoformed upper layer 614 having extensions 625 bonded to the injection molded base 612. The conveyor component 610 is formed by heating and shaping the upper layer 614 until a bonding surface of the upper layer is in a ready, bonding state in a mold. Then, the material for the base 612 is injected into the mold while the bonding surface is still in the ready, bonding state to form the base portion 612, such that the base portion 612 is bonded to the upper layer 614. The thermoformable portion may form the top of a module, or the bottom of the module.

In another embodiment, a drive bar for a conveyor belt may be thermoformed or compression molded, then a main body of the conveyor belt may be injection molded onto the drive bar. Alternatively, a main body may be thermoformed or compression molded, then a drive bar injection molded onto the main body.

In another embodiment, magnetic elements may be inserted in the conveyor component during formation. For example, a thermoformable material may be pre-heated and shaped then a magnet loaded onto the thermoformable material, followed by injection molding of another material to seal the magnet between the injection molded material and thermoformable material. The magnetic elements sandwiched in a conveyor component may be electromagnets having wires that are exposed to form contact points. For example, electromagnets may be embedded in a conveyor belt module between a thermoformable material and an injection molded material with contact points for the electromagnet at the edge of the module. A wear strip along the edge of the module may form a full-length contact for powering the electromagnet. For example, the contact may power the electromagnet at select times to create a magnetic force to attract items, such as metal pans, to the conveyor belt.

Although the invention has been described in detail with reference to a few exemplary versions, other versions are possible. The scope of the claims is not meant to be limited to the versions described in detail.

What is claimed is:

1. A conveyor component, comprising:
   a base portion formed of an injection moldable material; and
   an upper layer comprising UHMW polyethylene, wherein the upper layer has a bonding surface chemically bonded to the injection moldable material, and an opposite surface that is substantially smooth and undeformed.

2. The conveyor component of claim 1, wherein the conveyor component comprises one of a conveyor belt module, a position limiter and a wear strip.

3. The conveyor component of claim 1, further comprising a magnetic element sandwiched between the thermoformable material and the injection moldable material.

4. The conveyor component of claim 1, wherein the base portion comprises a snap clamp for mounting the conveyor component to a conveyor frame and the upper layer is a limiting surface for ensuring engagement between a conveyor belt and a drive.

5. A conveyor component comprising:
   a thermoformed first layer comprising UHMW polyethylene, the thermoformed first layer having a top surface that is substantially smooth and undeformed and an opposite bonding surface; and
   an injection molded base portion chemically bonded to the bonding surface of the thermoformed first layer.

6. The conveyor component of claim 5, further comprising a magnetic element sandwiched between the thermoformed first layer and the injection molded base portion.

7. The conveyor component of claim 5, wherein the injection molded base portion comprises one of polypropylene, polyethylene, and acetal.

8. The conveyor component of claim 5, wherein the injection molded base portion comprises a composite polymer.

9. A conveyor component, comprising:
   a base portion formed of an injection moldable material; and
   an upper layer comprising a ceramic-impregnated plastic chemically bonded to the injection moldable material.

10. The conveyor component of claim 9, wherein the conveyor component comprises one of a conveyor belt module, a position limiter and a wear strip.

* * * * *